Dec. 26, 1961 H. J. SNOW 3,014,236
APPARATUS FOR FORMING FIBERS
Filed July 11, 1958 3 Sheets-Sheet 3
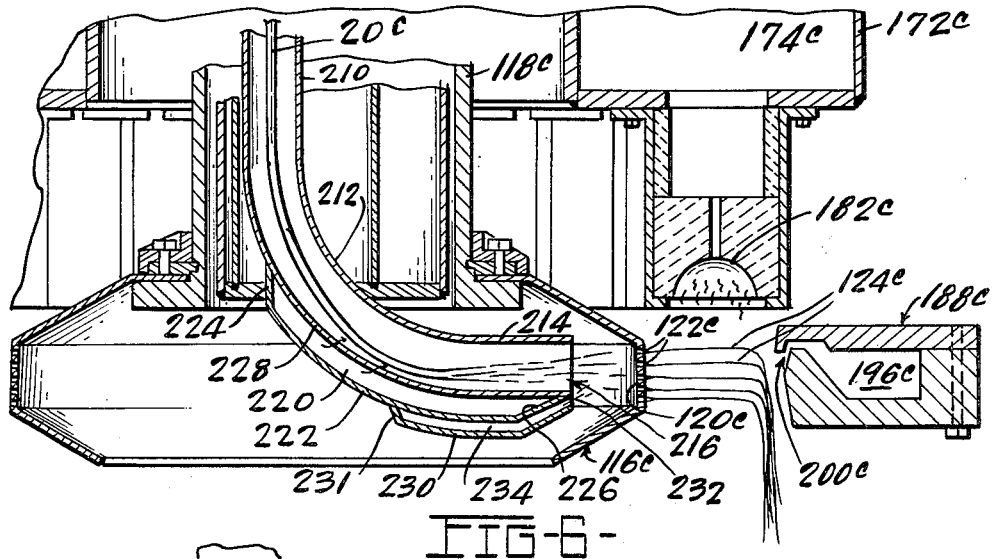
FIG-6-
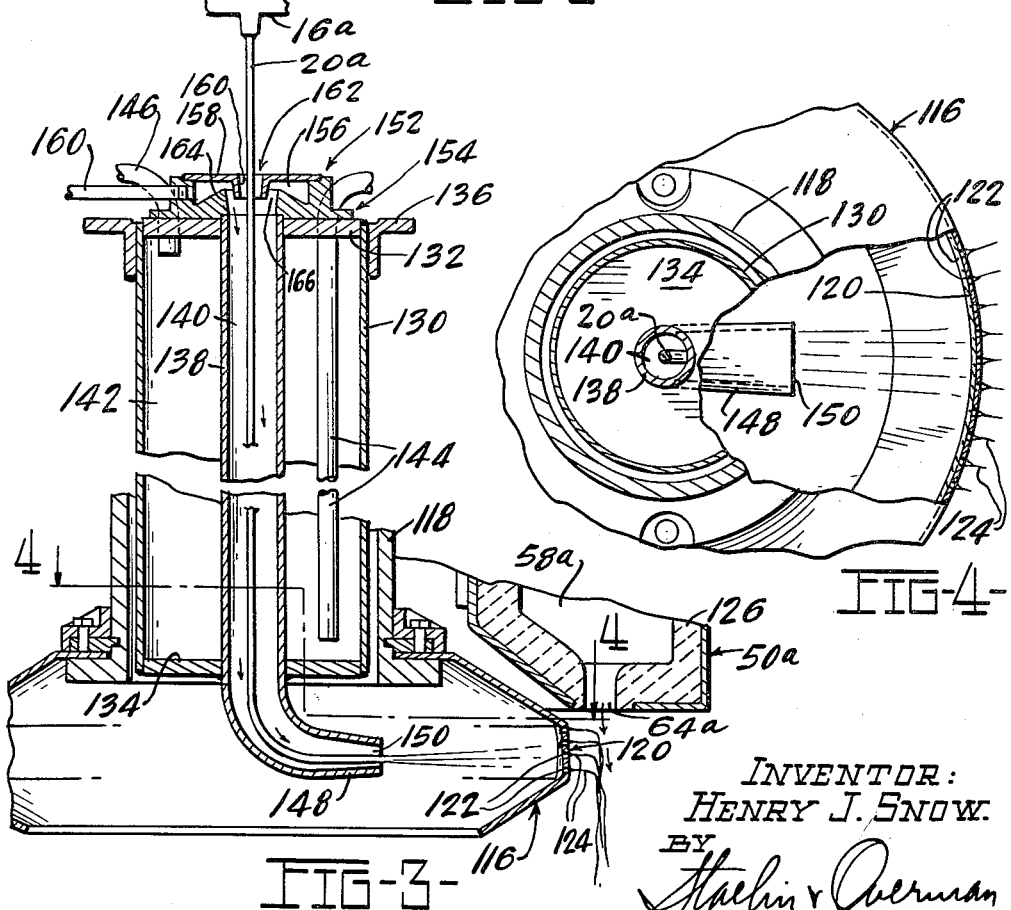
FIG-3-   FIG-4-
INVENTOR:
HENRY J. SNOW.
BY
ATTYS.

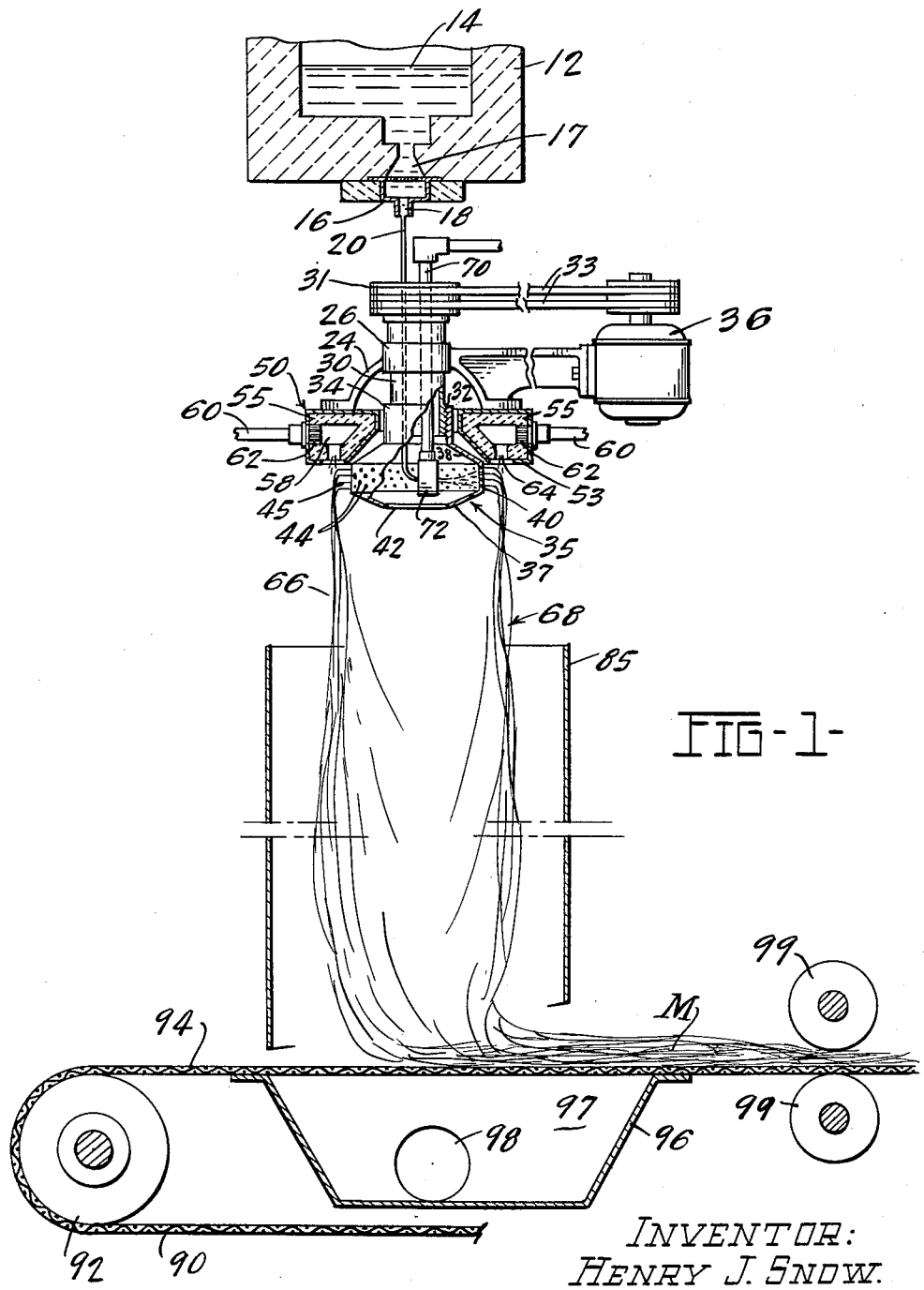

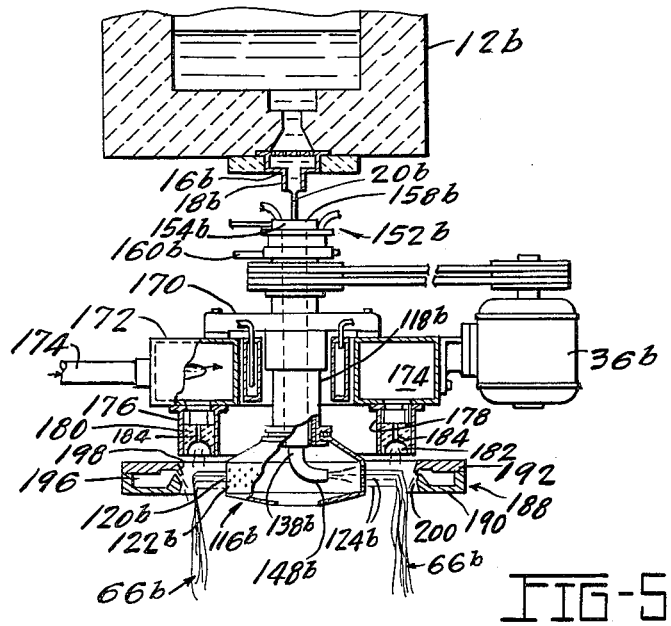
FIG-5-
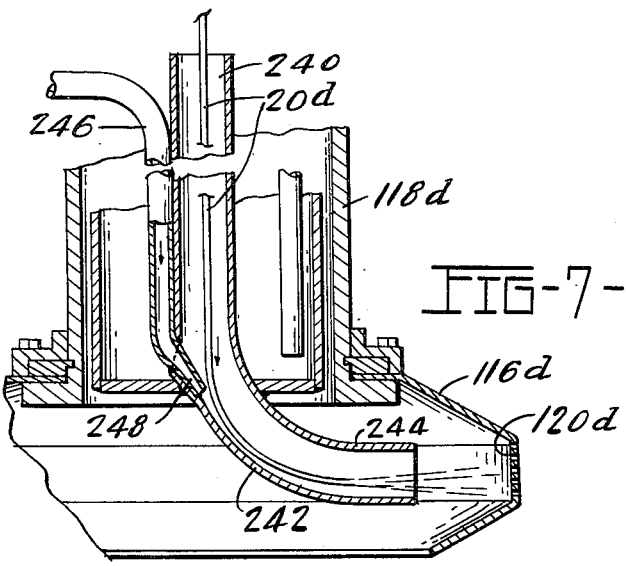
FIG-7-
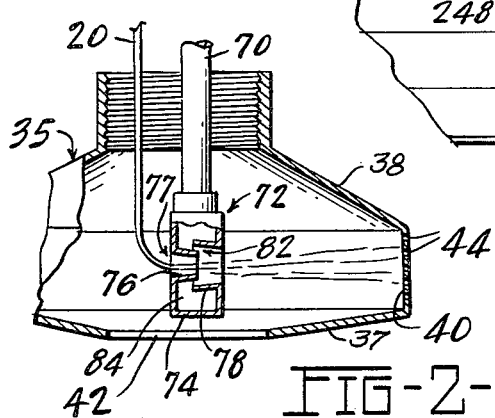
FIG-2-
INVENTOR:
HENRY J. SNOW.
BY
ATTYS.

United States Patent Office 3,014,236
Patented Dec. 26, 1961

3,014,236
APPARATUS FOR FORMING FIBERS
Henry J. Snow, Newark, Ohio, assignor to Owens-Corning Fiberglas Corporation, a corporation of Delaware
Filed July 11, 1958, Ser. No. 747,950
10 Claims. (Cl. 18—2.5)

This invention relates to apparatus for forming fibers from heat-softenable materials and more especially to the formation of fibers from mineral materials such as glass, slag or fusible rock, and is a continuation-in-part of my copending application Serial No. 510,884, filed May 25, 1955.

It is a well known practice to form fibers from molten glass or similar molten mineral materials by subjecting the molten material to high velocity blasts of steam or compressed air which draw or attenuate the streams of molten material to fibers. In the production of very fine glass fibers, a gaseous blast formed of intensely hot gases projected in a rectilinear path from a restricted orifice in the wall of a combustion chamber has been utilized as an attenuating force. In this method, solidified filaments or rods of glass are advanced endwise into the blast whereby the heat of the gases of the blast heats the filaments or rods to attenuating temperatures and the softened or heated material drawn into fine fibers by the velocity of the gases of the blast.

More recently developments have been made of a character wherein a stream of glass or other heat-softenable fiber-forming material is delivered into engagement with a spinner or rotor arranged to revolve at a speed sufficient to project the fiber-forming material outwardly of the axis of rotation by centrifugal forces, causing the material to be formed into elongated bodies or primary filaments. The filaments or bodies so formed are engaged by a gaseous blast to draw out or attenuate the bodies or filaments to fibers.

Heretofore, the stream of glass or other heat-softened material is delivered into a spinner or rotor in a path substantially coincident with the axis of rotation of the spinner or rotor, the material impinging upon a portion of the spinner or rotor or means carried thereby. The rotation of the spinner causes the glass or other material to be thrown or moved outwardly under the influence of centrifugal forces and the material collected on the interior periphery of a band or wall of the spinner or rotor, the wall being provided with openings through which the material is projected or extruded by centrifugal forces forming the elongated bodies or primaries which are delivered into an attenuating blast.

The present invention embraces means for distributing heat-softenable fiber-forming material in a hollow rotating body whereby improved distribution of the material is obtained at a circular zone from which primary fibers, filaments or elongated bodies of uniform character are formed from the material.

An object of the invention embraces means for forming primary fibers, filaments, or elongated bodies of heat-softenable fiber-forming material through the utilization of centrifugal forces wherein the fiber-forming material is distributed to a peripheral zone of a rotor by means or forces operative independently of the rotation of the rotor.

Another object of the invention is the provision of an improved means for effectively distributing molten or heat-softened mineral material over a peripheral zone or wall of a rotor.

Another object of the invention is the provision of an improved means for delivering molten glass or other heat-softened fiber-forming material under the influence of air or other gas under pressure into a circular zone from which primary filaments or bodies are formed by centrifugal forces wherein the glass or other material is rapidly conveyed to the circular zone in a manner to minimize loss of heat.

Another object of the invention resides in means for utilizing a gas stream or gaseous blast for conveying molten glass or other fiber-forming material to a peripheral wall of a hollow rotor for attaining efficient distribution of the glass or material at the interior wall surface of the rotor.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semidiagrammatic vertical sectional view illustrating a form of novel apparatus for carrying out the method of the invention;

FIGURE 2 is a detail sectional view through a spinner or rotor shown in FIGURE 1 illustrating an arrangement for deliverying fiber-forming material into the peripheral zone of the rotor;

FIGURE 3 is a sectional view through a rotor and supporting means therefor illustrating a modified arrangement for conveying heat-softened material toward a peripheral zone of a rotor;

FIGURE 4 is a fragmentary detail sectional view taken substantially on the line 4—4 of FIGURE 3;

FIGURE 5 is a view similar to FIGURE 1 illustrating a modified form of apparatus for forming fibers embodying the invention;

FIGURE 6 is an enlarged fragmentary sectional view of a modified form of apparatus for conveying heat-softened material toward a peripheral zone of a rotor, and FIGURE 7 is a modified form of the arrangement illustrated in FIGURE 6.

The apparatus of the invention are particularly usable with apparatus for forming fibers from heat-softenable mineral materials, such as glass, fusible rock or slag, wherein primary filaments or elongated bodies of the heat-softened material are formed by centrifugal forces and engaged and attenuated by high velocity gaseous blasts into comparatively fine fibers. It is to be understood that the apparatus of the invention, while having particular utility in the conveyance or delivery of heat-softened material to a circular zone, may be employed wherever the same may be found to have utility.

Referring to the drawings in detail and initially to the arrangement or apparatus shown in FIGURE 1, there is illustrated a forehearth 12 connected with a melting furnace (not shown) in which glass batch or other heat-softenable fiber-forming mineral material is reduced to a flowable state or condition providing a supply of the molten material 14 in the forehearth 12 as shown in FIGURE 1. Disposed beneath and secured to the bottom wall of the forehearth 12 is a feeder or bushing 16 which receives molten glass or other material from the forehearth 12 through a passage 17. The feeder 16 is formed with an orifice or outlet 18 through which a stream 20 of glass is discharged or delivered.

Disposed adjacent to and beneath the forehearth 12 is a frame or supporting means 24 which is formed or associated with a hollow boss portion 26 in which suitable bearings (not shown) are mounted which journally support a hollow shaft 30 for rotation about an axis. The lower end of the shaft 30 is threaded as at 32 to receive a hub portion 34 of a rotatable member, rotor or spinner 35. The rotor is adapted to rotate with the shaft 30 through the threaded inter-connection between the shaft and the hub 34 or other means for fixedly securing the shaft to the rotor.

The shaft 30 is equipped with pulleys or sheaves 31 driven by belts 33 from a motor 36 carried by the frame 24 whereby the rotor or spinner 35 is rotated at a comparatively high speed.

The rotor or spinner 35 is formed with a bottom wall 37 and an upper cone-shaped wall 38, the walls 37 and 38 being integrally joined to a circular cylindrical wall or peripheral band 40. The bottom wall 37 of the rotor is preferably formed with a central opening or open area 42 to facilitate the passage of gases out of the rotor and to substantially equalize or balance the stresses in the lower and upper walls 37 and 38 set up by high speed rotation at elevated temperatures and thereby minimize distortion of the rotor.

The peripheral band or cylindrical wall 40 is formed with rows of small openings or apertures 44 through which heat-softened fiber-forming material is extruded or projected outwardly in the form of elongated bodies, primary filaments or primaries 45 from material within the spinner or rotor by centrifugal forces set up or established by reason of the rotation of the spinner or rotor. The region of the perforated wall 40 provides a circular zone from which the primaries or elongated bodies are formed.

The primaries or elongated bodies 45 are adapted to be engaged by a high velocity gaseous blast or blasts for drawing or attenuating the bodies or primaries into fine fibers. The high velocity gaseous blast may be provided by projecting intensely hot gases or products of combustion through a restricted orifice of annular shape from a burner or chamber in which a combustible mixture is burned under confined conditions, or the high velocity gaseous blast may be provided of a character in which the temperature of the gases of the blast may be below the softening or attenuating temperature of the fiber-forming material, and steam or compressed air may be utilized for the purpose.

The arrangement illustrated in FIGURE 1 employs a high temperature gaseous blast formed of products of combustion. Disposed adjacent and surrounding the rotor 35 is a means such as a burner 50 of the internal combustion type for producing a gaseous blast or blasts for drawing or attenuating the bodies or primary filaments into fine fibers. The burner is preferably generally annular in configuration and is constructed with a metal casing or housing 53, the interior being lined with high temperature refractory 55, the interior wall surfaces of the refractory defining an annularly-shaped zone or combustion chamber 58.

Pipes or ducts 60 spaced circumferentially of the burner are adapted to convey or deliver a fuel and air mixture into the combustion chamber 58 where the mixture is substantially completely burned. The mixture being supplied through each of the tubes or ducts 60 passes through a plurality of comparatively small channels or perforations 62 provided in a wall of the burner, the perforated wall portion forming a fire screen to prevent preignition of the mixture in the supply tubes 60.

The fuel and air mixture is introduced into the chamber 58 under comparatively low pressure of from three to ten pounds per square inch. The burning gases in the combustion chamber or confined zone 58 undergo great expansion, heating the walls of refractory to incandescence and accelerating combustion and flame propagation in the chamber.

The lower wall of refractory defining the combustion chamber is formed with a restricted orifice or passage 64 through which the intensely hot burned gases or products of combustion from the burner chamber 58 are projected, delivered or discharged as a high velocity gaseous blast. The orifice or passage 64 is preferably of annular character to provide a blast of annular cross-section and is disposed substantially concentric with the peripheral band 40 of the spinner. The temperature of the gases forming the high velocity blast may be 3,000° F. or more, a temperature well above the softening temperature of glass.

The primaries or bodies 45 of fiber-forming material are delivered outwardly and endwise into the gases of the blast adjacent the orifice 64, the force of the high velocity blast attenuating the material of the primaries to fine fibers 66 which move downwardly in a generally hollow cylindrical pattern or formation referred to herein as a beam of fibers 68. Any suitable gaseous fuel such as butane, methane or propane, may be utilized as the combustible of the mixture burned within the chamber 58.

The arrangement is inclusive of means for delivering a stream of glass or other fiber-forming material into engaging relation with the inner surface or zone of the wall or peripheral band 40 of the rotor or spinner 35. In order to obtain satisfactory formation of elongated bodies or primary filaments of the material, the material must be delivered into contact with the peripheral band of the spinner in a minimum of time and in a manner to prevent substantial loss or transfer of heat from the stream in its movement to the inner wall of the spinner.

In the arrangement illustrated in FIGURES 1 and 2, the glass or other material is delivered or distributed from the stream 20 to the peripheral wall of the spinner by means of a fluid or gas stream.

Extending into the rotor or spinner 35 is a tube or pipe 70 which supports a blower construction 72 within the rotor. The blower construction 72 includes an annular housing or casing 74 which provides a passage or guide for the glass of the stream 20. A guide tube 76 forms a component of the blower 72 and the wall thereof is preferably of frusto-conical shape. A second wall 78 of the blower construction is spaced from and preferably overlaps an end zone of wall 76 to provide an annular orifice or nozzle 82 which is in communication with an annular chamber 84 formed within the blower housing 74.

A stream 20 of glass or other fiber-forming material from a feeder flows substantially parallel with the pipe 70 and adjacent the passage 77 provided by the guide tube 76. Compressed air or other gas under pressure is supplied to the annular chamber 84 through the pipe 70 and is discharged as a high velocity annular blast through the passage defined by the frusto-conically shaped wall 78 toward the peripheral perforated wall 40 of the rotor 35.

The glass of the stream 20 is drawn or directed into the passage 77 by the suction or aspiration set up by the high velocity air blast or air stream emanating from the annular orifice 82, the glass being propelled by the blast to the inner surface of the peripheral wall 40 of the rotor.

The spent gases are discharged through the circular opening 42 in the bottom wall of the rotor. The material at the wall 40 is projected by centrifugal forces through the openings 44 to form elongated bodies or primary filaments.

The nozzle construction 72 is disposed in relation to the glass stream 20 so that the jet or blast of air or other material distributing medium draws the glass into the passage 77 and entrains, conveys or carries the glass radially of the axis of the rotor or spinner to impinge the glass onto the inner surface of the peripheral wall or band 40 thereof. The glass or other material delivered against the spinner wall forms a film or layer which, under the influence of centrifugal forces, spreads over the area of the band 40 and over the openings 44 in the circular wall or band 40.

By this method a supply of molten or flowable glass or other fiber-forming material is maintained within the spinner at the peripheral zone thereof so that primary fibers or elongated bodies 44 of uniform character may be continuously formed during rotation of the spinner.

The blower or nozzle construction 72 from which the air or gas stream is projected is relatively stationary as shown in FIGURE 1 and hence the glass is conveyed in a generally rectilinear path toward the band or wall 40. Through the use of the arrangement shown in FIGURE 1, the molten glass or other material of the stream 20 is conveyed by the gas blast or gas stream at a high rate of speed under the influence of the high velocity of the gas stream and is moved through the shortest path into engagement with the spinner in a minimum amount of time with minimum heat loss.

The rotor or spinner 35 is rotated at speeds upwards of 3,000 r.p.m. or more and the centrifugal forces acting on the film or layer of glass or other material at the inner surface of the band 40 of the spinner spreads or flows the glass over the peripheral band to attain a substantially uniform thickness even though the glass from the stream 20 is projected in a rectilinear path toward the peripheral wall of the spinner.

It has been found that compressed air provides an inexpensive and effective material distribution medium. However, other gases may be used for the purpose. For example hot gases of combustion may be projected through the tube 70 and from the blower 72 for distributing the glass if desired. Steam may also be used as a material distributing medium. The spent gases may be dissipated in the atmosphere through the opening 42 in the bottom wall of the rotor 35.

While it is advantageous in forming fine fibers from the primaries or bodies 45 to utilize a high velocity blast or blasts of intensely hot gases, it is to be understood that an annular attenuating blast may be formed of other gases, as for example steam, compressed air, or the like as hereinafter described.

The attenuated fibers 66 move downwardly in the form of a hollow beam or hollow cylindrical pattern 68 and are collected in any suitable manner. As shown in FIGURE 1, the beam 68 of fibers may be directed through an enclosure or shield 85 onto a collecting surface. A foraminous endless belt or conveyor 90 is supported by rollers 92, one of which is shown in FIGURE 1, the upper flight 94 of the conveyor providing a surface upon which the fibers of the beam may be collected.

Disposed beneath the upper flight 94 of the conveyor and in registration with the beam of fibers is a sheet metal casing or box 96 forming a chamber 97 connected by means of a duct or pipe 98 with a suction blower or other source of reduced pressure. Through this arrangement, the subatmospheric or reduced pressure in the chamber 97 assists in the collection of the fibers upon the surface 94 and conveys away spent gases of the attenuating blast.

The collected fibers form a mass or mat M which may be impregnated with binder if mass integrity is desired in the mat. The mat of fibers may be compressed or sized by passing the same between rollers 99. If the mat is treated with binder, the binder may be cured by passing the mat through a heating oven or curing zone (not shown).

FIGURES 3 and 4 illustrate a modified form of means for utilizing compressed air or other gas under pressure for distributing heat-softened fiber-forming material within a rotor. In this form the rotor 116 is supported upon the lower extremity of a hollow shaft 118 and is adapted to rotate with the shaft, the shaft being driven by suitable means such as that illustrated in FIGURE 1. The rotor 116 is provided with a circular zone or peripheral wall 120 provided with rows of small orifices or outlets 122 through which the heat-softened material on the interior of the rotor is projected by centrifugal forces of rotation through the orifices or outlets 122 forming primaries or elongated bodies 124 of the fiber-forming material.

The elongated bodies 124 may be projected into a high velocity blast of hot gases provided by products of combustion delivered through a restricted annularly-shaped orifice 64a from a combustion zone or chamber 58a from a burner 50a of the character illustrated in FIGURE 1. The high velocity blast projected through the orifice 64a engages the elongated bodies 124 which are projected endwise into the blast of annularly-shaped cross-section, the forces of the blast attenuating the material of the bodies to fine fibers. The gases of the high velocity blast move in paths substantially concentric with the peripheral wall 120 and the fibers attenuated by the blast move in a hollow or tubular column or beam as they move away from the attenuating zone.

Disposed within the hollow shaft 118 is a relatively stationary construction or arrangement for guiding, conveying and delivering fiber-forming material from a supply into the interior surface of the peripheral wall or circular zone 120 of the rotor. The apparatus includes a comparatively thin-walled cylindrical sleeve or member 130 welded to circular plates or members 132 and 134 disposed respectively at the top and bottom ends or zones of the sleeve 130. A flanged member 136 is fixedly secured to the upper end zone of the sleeve 130 and is adapted to engage a suitable support (not shown) providing a stationary mounting for the cylindrical sleeve 130 and components carried by or associated therewith. The exterior diameter of the sleeve 130 is less than the interior diameter of the hollow shaft providing running clearance for the shaft.

Preferably disposed centrally of the plates 132 and 134 and extending through openings therein is a tube or tubular member 138 forming a walled passage 140 which is adapted to receive and accommodate a stream of glass 20a or other fiber-forming material delivered through an orifice provided in a feeder 16a of the character illustrated in FIGURE 1 connected with a forehearth containing a supply of the molten glass. The tube 138 is welded or otherwise secured to the plates 132 and 134 to form a seal.

The circular cylindrical sleeve 130 and the plates 132 and 134 define a chamber 142 adapted to accommodate a circulating cooling fluid or medium such as water. An inlet pipe 144 extends through an opening in the plate 132 for conveying water or other cooling medium into the chamber 142, and an outlet pipe 146 extending through the plate 132 conveys the water or medium away from the chamber. The inlet tube 144 terminates adjacent the lower plate to convey or deliver the incoming cooling medium into a region adjacent the plate 134. The rate of flow of circulating water or cooling medium through the chamber 142 may be regulated by valve means (not shown) to control and maintain the temperature of the tube 138 below a temperature at which the glass tends to wet the interior wall of the tube.

The tube 138 defining the passageway 140 for receiving the molten material is formed at its lower end with an elbow-shaped or angularly arranged portion 148 which is formed with a tapered zone terminating in an orifice or nozzle 150. The nozzle 150 is disposed so as to direct molten fiber-forming material toward the interior peripheral zone or surface of the rotor wall 120.

Mounted adjacent the upper end of the tube 138 is a means for directing or blowing air or other gas into the entrance region of the tube 138 to convey the material or glass of the stream 20a through the tube and thence project the glass from the orifice or nozzle 150 with adequate force to propel the molten glass or other material directly into contact or engagement with the interior surface of the peripheral wall 120.

In the embodiment illustrated in FIGURE 3, a blower or blower means 152 is mounted upon or supported by the upper plate 132.

The blower 152 is inclusive of a substantially circular base member 154 formed with an annularly-shaped chamber 156. The member 154 is provided with a cover or closure plate 158 forming an upper wall of the annular chamber 156. The base member 154 is provided with a threaded opening to receive a tube 160 which is connected with a supply of compressed air or other gas under pressure.

The cover member or plate 158 is formed with a depending tubular portion defined by a circular wall 160 which provides a passage or guide 162 through which the stream 20a of glass or other material flows into the tube 138. The depending extremity of the circular wall 160 is spaced from a circular wall 164 formed on the base member 154 forming an annularly-shaped passage or orifice 166 through which the compressed air or other gas under pressure in the chamber 156 is discharged at a substantial velocity into the passage 140.

The air stream from the orifice 166 of the blower 152 flows through the tube 138 engaging the glass of the stream or other molten material and propels and conveys the glass through the nozzle or orifice 150 toward the rotor wall 120.

As the annular orifice 166 of the blower 152 provides a substantially hollow tubular air stream moving through the tube 138 and as the passage 162 is of frusto-conical shape and admits induced air through the passage completely surrounding the stream of glass 20a, the glass stream is thereby influenced to move downwardly through the tube substantially at the axis thereof and out of contact with the vertical wall of the tube 138 so that the glass will not contact or cling to the inner wall of the tube. Through the arrangement shown in FIGURES 3 and 4 a stream of glass of substantial size is rapidly conveyed through the tube 138 and projected from the orifice 150 into contact with the wall 120 under the influence of the high velocity gas stream moving through the tube 138 from the blower 152 and provide at the interior surface or circular zone of wall 120 an adequate quantity of glass or other material for extrusion through the openings 122 to form the primaries or elongated bodies 124 which are engaged and attenuated to fibers by the blast emanating from the annular orifice 64a.

FIGURE 5 illustrates an apparatus and method of utilizing the invention to distribute glass or other heat-softened fiber-forming material wherein the elongated bodies delivered outwardly by centrifugal forces from a rotor or spinner are projected through an annular region adjacent the bodies in which heat is applied to reduce or minimize heat loss from the elongated bodies or primaries of glass and the bodies projected into a ring-shaped high velocity gaseous blast of a temperature preferably below the softening or attenuating temperature of the glass or other material.

In the arrangement illustrated in FIGURE 5, a stream of heat-softened glass or other material 20b flows through an orifice in a feeder 18b from a supply of molten glass contained in a forehearth 12b. The fiber-forming apparatus is supported upon a frame 170 in which is journally supported a hollow shaft 118b, the lower end of which supports the rotor or spinner 116b of the character illustrated in FIGURE 3. The hollow shaft 118b may be driven from a motor 36b through suitable means, for example the pulley and belt arrangement illustrated in FIGURE 5. The rotor 116b is rotated at a speed upwards of 3,000 r.p.m. or more sufficient to establish centrifugal forces for projecting heat-softened material through the orifices 122b formed in a peripheral wall 120b of the rotor construction whereby the elongated bodies or primaries 124b are projected through an annular heating zone into a high velocity gaseous blast.

In the embodiment illustrated, the heating means providing the annular heating zone is of the radiant type, but it is to be understood that other forms of heat such as flame heat or electrical heat, either inductive or resistance, may be utilized for the purpose if desired.

Surrounding the shaft 118b and secured to the support 170 is an annularly-shaped manifold or casing 172 which provides a manifold chamber 174 of annular-shape and adapted to be supplied with combustible mixture of fuel gas and air from a supply (not shown) through a tube or duct 174.

Secured to the manifold casing 172 and depending therefrom is an outer circular wall 176 and an inner circular wall 178. Disposed between the walls 176 and 178 is a refractory construction 180 of annular configuration formed as a single, ring-shaped member. The refractory construction may comprise an assembly of segments of refractory arranged in abutting relation to occupy the annular space between the circular walls 176 and 178. The refractory construction 180 is preferably formed with a plurality of semi-spherically or cup-shaped recesses or depressions 182 of semi-spherical configuration forming radiant heaters.

Each of the cup-shaped recesses 182 is in communication with the manifold chamber 174 by a passage 184. The fuel and air mixture in the manifold chamber 174 is delivered under comparatively low pressure through the passages 184 into the recesses 182, the mixture being ignited at the zones of entrance of the passages 184 into the recesses and the mixture burning within the recesses providing the annular heated region through which the elongated bodies 124b are projected in their traverse from the periphery of the rotor 116b into an attenuating blast.

Surrounding the rotor or spinner 116b and disposed at the outer boundary of the heated region provided by the radiant heaters 182 is an annular blower 188 comprising a housing 190 provided with an annular cover plate 192, the housing being formed with an annular manifold or chamber 196.

The plate 192 is provided at its innermost region with an annular depending lip 198 which is spaced from the inner wall of the blower housing 190 providing an annularly-shaped orifice 200 through which gas under pressure in the manifold 196 is projected in a direction generally downward or parallel with the axis of rotation of the rotor to provide a hollow cylindrical attenuating blast.

Steam or compressed air may be utilized to provide the gaseous blast. Thus the elongated bodies of glass or other material 124b in a softened or attenuating condition are delivered into the blast of gases projected through the annular orifice 200 and are engaged and attenuated to fibers 66b by the downwardly moving gases of the blast. By reason of the circular attenuating region of the blast, the fibers are oriented in a tubular or hollow beam formation, the fibers moving downwardly and collected into a mat formation in the manner illustrated in FIGURE 1.

The glass distributing arrangement for delivering glass of the stream 20b into contact with the peripheral zone or wall 120b of the rotor may be of the character illustrated in FIGURE 3. Thus the stream of glass 20b flows through a central opening in the plate 158b mounted upon a blower casing or housing 154b of a blower construction 152b, the glass moving downwardly through the tube 138b. The tube 138b is formed with an elbow portion 148b which terminates in an orifice through which the glass is projected toward the interior surface of the rotor wall 120b.

The blower construction 152b is of the same construction as shown in FIGURE 3 and gas under pressure such as compressed air supplied to the blower through a pipe 160b is delivered downwardly through the tube 138b engaging the glass and conveying and propelling the glass through the elbow portion 148b and through the orifice at the terminus of the elbow portion toward the peripheral wall of the rotor. The volume of compressed air and the pressure thereof delivered into the tube 138b by the blower 152b is adequate to entrain and propel the glass into contact with the peripheral wall 120c of the rotor at which zone centrifugal forces thereafter maintain the glass adjacent the rotor wall for extrusion through the openings 122b in forming the elongated bodies 124b.

FIGURE 6 illustrates a modified arrangement for distributing or delivering glass or other heat-softened material into contact with a peripheral wall of a rotor. The rotor construction 116c shown in FIGURE 6 is of the same character as that shown in FIGURES 3 and 5 and is mounted upon the lower end of a hollow shaft 118c. The hollow shaft 118c is supported and driven in the manner illustrated in FIGURE 5 or by other suitable driving means.

The manifold construction 172c, manifold chamber 174c and the radiant heaters 182c are of the same construction as heretofore described and illustrated in FIGURE 5. The blower 188c is of the same construction as shown in FIGURE 5, being formed with a manifold 196c to accommodate steam under pressure or compressed air which is delivered through the annularly-shaped orifice 200c as a high velocity gaseous blast of annular cross-section.

In the arrangement shown in FIGURE 6, a tube 210, of a character similar to the tube 138, is disposed within the hollow shaft 118c. A blower (not shown) of the character illustrated at 152 in FIGURE 3 is arranged at the upper end of the tube 210 for delivering compressed air or other gas under pressure into the tube 210 in a manner to engage the glass of a stream flowing into the tube in the manner shown in FIGURES 3 and 5. The tube 210 is formed with an elbow portion 212 of substantial radius to facilitate a gradual transition or change in direction of the glass from a vertical path to a lateral path through a substantially horizontal portion 214 of the glass guiding and conveying means. The end of the portion 214 is open providing an orifice or discharge passage 216 through which the glass is projected under the influence of the high velocity air blast introduced into the tube 210 propelling the glass into contact with the peripheral zone at the inner surface of the wall 120c of the rotor.

The molten glass does not tend to stick or cling to the inner wall of the tube 210 unless the tube becomes heated to a temperature at which the glass will "wet" the wall. It is therefore desirable to maintain the glass surrounded with an air layer to avoid contact of the glass with the tube wall. FIGURE 6 illustrates an arrangement for assisting in avoiding or preventing contact of the glass with the elbow portion 212 at the lower end region of the tube 210.

Disposed beneath the elbow portion 212 is a chamber 220 defined by a member 222 which is spaced from and substantially coincident with the exterior surface region of the elbow 212 and is joined at one end to the wall of the elbow by means of a plate 224, the other end being joined to the terminus of the nozzle portion 214 by a plate 226, the plates or members 224 and 226 being welded to the elbow and nozzle portions. The plate 222 in cross-section extends approximately one half of the periphery of the elbow portion 212 so that the chamber 220 embraces the lower half of the exterior area of the elbow portion. The chamber 220 may be connected by a tube (not shown) with a source or supply of compressed air. The region 228 of the elbow portion 212 may be fashioned of porous metal and air from the chamber 220 filters or bleeds through the porous metal forming an air cushion or layer at the interior surface of the elbow portion beneath the glass to avoid contact of the glass with the metal of the elbow. This arrangement prevents sticking of the glass or molten material to the wall of the elbow and hence minimizes plugging of this region of the glass conveying and distributing means.

Means is also illustrated in FIGURE 6 for assisting in propelling the glass through the region from the terminus of the nozzle portion 214 to the inner surface of the rotor wall 120c. Disposed beneath the plate 222 is a second plate 230 having one end region 231 welded or joined to the plate 222, the other end of the plate 230 terminating at the orifice of the nozzle portion 214 providing a second orifice 232.

The lower wall of the plate 222 and the plate 230 define a passage or chamber 234. The chamber 234 may be connected with a supply of compressed air or other gas under pressure by means (not shown) whereby a blast or jet of air is projected from the orifice 232 beneath the glass to assist in supporting and propelling the glass in its traverse from the nozzle 214 to the rotor wall 120c and aids in distributing the glass at the wall. It also prevents concentration or excess accumulation of glass at the lower region of the wall 120c. The compressed air supplied to the chambers 220 and 234 may be regulated by valve means independent to each chamber to control the flow of air through the porous metal at the region 228 of the elbow 212 and control the effectiveness or velocity of the air blast or jet projected through the orifice 232. The plate 230 defining the chamber 234 and forming a wall of the orifice 232 embraces the lower portion of the plate 222, the orifice 232 being of arcuate shape in cross-section to provide a sheet-like blast of air beneath the glass projected from the nozzle 214.

Thus the stream of glass 20c is conveyed through the tube 210, the elbow portion 212 and the horizontal nozzle portion 214 in a manner avoiding contact of the glass with the metal walls of the conveying or guiding means.

The rotor 116c is rotated at a speed whereby centrifugal forces are effective on the softened glass in contact with the inner surface of the wall 120c whereby the glass is extruded through the orifices or outlets 122c forming elongated bodies or primaries 124c. The bodies 124c traverse the region beneath the radiant heaters 182c, the heat therefrom retarding loss of heat from the bodies 124c which enter the steam or compressed air blast projected through the annularly-shaped orifice 200c provided by the blower construction.

FIGURE 7 illustrates a modified form of construction for conveying and propelling softened glass or other softened material into contact with the interior wall of a rotor. As shown in FIGURE 7, the rotor 116d is supported upon the lower end of a hollow shaft 118d which is of the same construction as illustrated in FIGURES 3 and 6. A glass conveying tube 240 of the same general character as that shown at 210 is disposed within the interior of the hollow shaft 118d and is provided with an elbow portion 242 terminating in a substantially horizontal nozzle portion 244. The tube 240 receives a stream of glass 20d and the upper end region of the tube 240 is provided with a blower construction substantially the same as that indicated at 152 in FIGURE 3 for delivering a blast of compressed air or other gas under pressure downwardly through the tube 240 to convey and propel the glass of the stream through the elbow portion 242 and the nozzle 244 into contact with the interior surface of the peripheral wall 120d of the rotor 35d.

The arrangement shown in FIGURE 7 is inclusive of a modified form of means for providing an air layer or air cushion at the interior surface region of largest radius of the elbow 242. Disposed in substantial parallelism with the tube 240 is a second tube 246, the lower end portion of which is flattened to provide a nozzle 248, the flattened portion of the tube extending through a slot or kerf formed adjacent the juncture of the elbow portion 242 with the rectilinear portion of the tube 240.

The flattened portion of the tube at the orifice region 248 is of slightly curved configuration to fit the transverse curvature of the elbow portion 242 whereby the configuration of the orifice is elongated peripherally of the elbow portion 242 and directs a sheet-like layer of air of substantial width at the interior surface of the elbow at its larger radius and beneath the glass to prevent the glass from contacting the wall of the elbow portion 242 and the interior wall of the nozzle portion 244. The tube 246 is connected with a source or supply of compressed air and valve means (not shown) may be associated with the tube 246 to regulate the flow of air or other gas through the nozzle 248 and thus control the effectiveness of the air cushion or air layer beneath the glass at the elbow and nozzle portions of the glass conveying means.

It is to be understood that the forms of glass distributing means disclosed herein may be embodied in the fiber-forming apparatus shown in FIGURE 1 or that shown in FIGURE 5.

It is apparent that, within the scope of the invention, modifications and different arrangements may be made other than is herein disclosed, and the present disclosure is illustrative merely, the invention comprehending all variations thereof.

I claim:

1. Apparatus for forming elongated bodies from heat-softenable material including, in combination, a support, a member having a circular peripheral wall journalled upon the support, means for rotating the member, a walled passage having an outlet within a region defined by the circular wall, means for delivering a stream of the heat-softened material into the walled passage, means for delivering gas under pressure into the walled passage for propelling the material through the outlet onto the peripheral wall of the member, said peripheral wall having openings through which the material is projected by centrifugal forces to form the material into elongated bodies.

2. Apparatus for forming elongated bodies from heat-softened mineral material including, in combination, a support, a hollow rotor journalled upon the support, means for rotating the rotor, a walled passage having an outlet within and spaced from the rotor, means for feeding a stream of the heat-softened material to the walled pasage, orifice means for delivering fluid under pressure into the passage for propelling the heat-softened material through the outlet toward an interior surface of the rotor, the wall region of the rotor defining said surface having openings through which the material is projected by centrifugal forces to form the material into elongated bodies.

3. Apparatus for forming fibers from heat-softened mineral material including, in combination, a support, a hollow rotor having a wall formed with a plurality of orifices journalled on the support, means for rotating the rotor, blower means including a walled passage having an outlet within the hollow rotor, means for flowing a stream of the heat-softened material from a supply into the passage, said blower means being arranged to direct gas under pressure into the passage into engagement with the material and project the material through the outlet of the passage to the interior surface of the rotor wall, said material at the wall being propelled by centrifugal forces of rotation through the orifices forming elongated bodies, and means establishing a high velocity gaseous blast generally concentric with the rotor whereby the blast engages the bodies and attenuates the material of the bodies to fibers.

4. Apparatus for processing heat-softenable material including, in combination, a support, a hollow shaft rotatably mounted on the support, a hollow rotor having a perforated peripheral region adapted to be driven by the shaft, means for rotating the shaft and rotor, tubular means extending through said shaft and having an outlet within the rotor, means for feeding heat-softened material into said tubular means, means for delivering a gas into the tubular means in contact with the heat-softened material for advancing the material in the tubular means and discharging the material through the outlet, the outlet of the tubular means being arranged to direct the material discharged therefrom toward the perforated peripheral region of the rotor, the centrifugal forces of rotation of the rotor projecting the material through the perforations to form discrete bodies.

5. Apparatus for processing heat-softened mineral material including, in combination, a support, a hollow rotor having a wall formed with a plurality of orifices journalled on the support, means for rotating the rotor, a blower provided with a walled passage, means for flowing a stream of the heat-softened material from a supply into the passage, said blower being arranged to direct gas under pressure into the passage into engagement with the material and project the material through the outlet of the passage to the interior surface of the rotor wall, a supplemental chamber disposed adjacent a portion of the walled passage within the rotor, a wall portion of the passage forming a wall portion of the chamber and being porous, said supplemental chamber being adapted to receive gas under pressure whereby the gas passes through the porous wall and provides a layer of gas adapted to support the material in the passage adjacent the porous wall, the material at the surface of the rotor wall being extruded by centrifugal forces of rotation of the rotor to form the material into elongated discrete bodies.

6. Apparatus for processing heat-softened mineral material including, in combination, a support, a hollow rotor having a wall formed with a plurality of orifices journalled on the support, means for rotating the rotor, a blower formed with a walled passage, means for flowing a stream of the heat-softened material from a supply into the passage, said blower being arranged to direct gas under pressure into the passage into engagement with the material and project the material through the outlet of the passage to the interior surface of the rotor wall, a supplemental chamber disposed adjacent the outlet of the passage, said supplemental chamber being formed with a restricted orifice, said chamber being adapted to accommodate gas under pressure projected from the orifice toward the rotor wall to assist in supporting and conveying the heat-softened material delivered from the outlet of the passage, the material at the rotor wall being extruded by centrifugal forces of rotation to form the material into elongated discrete bodies.

7. Apparatus for processing heat-softenable material including, in combination, a support, a hollow shaft rotatably mounted on the support, a hollow rotor having a peripheral region formed with a plurality of orifices, means for rotating the hollow shaft and rotor, a relatively stationary tube extending through said hollow shaft and having an elbow portion terminating in a discharge outlet within the rotor, means for feeding heat-softened material into the tube, a blower, said blower being arranged to direct compressed air into the tube for advancing the heat-softened material therethrough, the discharge outlet being arranged to direct the material adjacent the peripheral region of the rotor, the centrifugal forces of rotation extruding the material through the perforations to form discrete bodies.

8. Apparatus for forming fibers from molten glass comprising, in combination, a hollow rotor having a circular peripheral wall and that is journalled for rotation, means for rotating the rotor, said rotor having a plurality of stream-forming openings in the peripheral wall thereof, a walled passage having an outlet within and spaced from the wall of said rotor, means for feeding a supply stream of molten glass into the interior of said rotor and through said walled passage, and means for delivering gas under pressure into the walled passage along at least a part of its length for supporting the molten material therein and for aiding in the discharge of the molten material from the outlet thereof.

9. Apparatus acording to claim 8 in which the means for delivering gas under pressure into the walled passage comprises a chamber having a common wall with said walled passage along at least a part of the length thereof and said common wall is porous for the passage of gas from said chamber into said walled passage.

10. Apparatus for forming fibers from molten glass comprising, in combination, a hollow rotor having a circular peripheral wall and that is journalled for rotation on a vertical axis, means for rotating the rotor, said rotor having a plurality of stream-forming openings in the peripheral wall thereof, a glass supply tube extending downwardly into the interior of said rotor, means for feeding a supply stream of molten glass into the upper end of said glass supply tube, a horizontally turned, deflecting elbow mounted at the lower end of said tube within and independently of said rotor, at least the lower part of the wall of said elbow being porous, a chamber on the outer side of the porous part of said wall of said elbow, said porous part of said wall being common to said elbow and to said chamber, and means for supplying gas under pressure to said chamber, whereby the gas passes through the porous wall and provides a layer of gas for supporting the glass in the supply stream and aids the discharge of the glass from said elbow.

References Cited in the file of this patent

UNITED STATES PATENTS

| | | |
|---|---|---|
| 2,431,205 | Slayter | Nov. 18, 1947 |
| 2,577,431 | Powell | Dec. 4, 1951 |
| 2,609,566 | Slayter et al. | Sept. 9, 1952 |
| 2,624,912 | Heymes et al. | Jan. 13, 1953 |
| 2,632,920 | Koehler | Mar. 31, 1953 |
| 2,816,826 | Brennan | Dec. 17, 1957 |